United States Patent

[11] 3,633,083

[72] Inventor  Dan Teodorescu
                Timisoara, Romania
[21] Appl. No. 697,364
[22] Filed     Jan. 12, 1968
[45] Patented  Jan. 4, 1972
[73] Assignee  Ministerul Industriei Constructillor de Masini
                Bucharest, Romania
[32] Priority  Jan. 25, 1967
[33]           Romania
[31]           52958

[54] FERRORESONANT AMPLIFYING SERVOMOTORS
     6 Claims, 6 Drawing Figs.
[52] U.S. Cl. .................................................. 318/225 R,
                                                    318/513
[51] Int. Cl. ................................................ H02p 5/28
[50] Field of Search ........................................... 318/138,
                                                    225, 254, 513

[56]              References Cited
              UNITED STATES PATENTS
3,280,398  10/1966  Marie ........................... 318/166
3,178,625   4/1965  Pintell .......................... 318/138
3,290,572  12/1966  Hartmann et al. ........... 318/138
3,321,688   5/1967  Von Delden .................. 318/138
3,324,368   6/1967  Von Delden .................. 318/138
3,381,192   4/1968  Neville et al. ................. 318/138

Primary Examiner—Gene Z. Rubinson
Attorney—Waters, Roditi, Schwartz & Nissen

ABSTRACT: A ferroresonant servomotor characterized by the fact that saturation coils are series connected with diodes and the resulting circuits are in parallel connection and are connected to an alternating current supply voltage, the diodes, which are connected in series with the saturation coils through which passes flux produced by primary coils of the same ferroresonant circuit, being connected in an inverse conduction sense, while control coils proper, through which passes direct current, are mounted on each pole in such a way that their ampere-turns are added in the closed magnetic circuit of the pole to the ampere-turns of the saturation coils on the poles of one of the ferroresonant circuits and are subtracted from the ampere-turns of the saturation coils at the poles of the other ferroresonant circuit.

FERRORESONANT AMPLIFYING SERVOMOTORS

DRAWING

DETAILED DESCRIPTION

Figure 1:
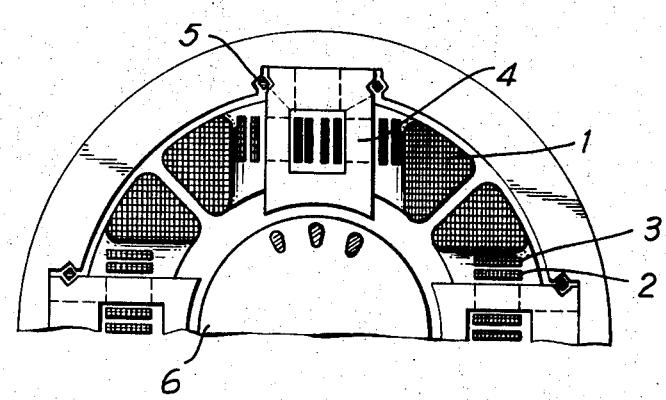
FIG. 1 is a partial section through a ferroresonant, bipolar amplifying servomotor.

This invention relates to asynchronous ferroesonant servomotors i.e. asynchronous motors with stator windings forming ferroresonant circuits utilized as actuating mechanisms in automatic systems.

For the actuating of regulation elements in automatic systems (cocks, slide valves, potentiometers, etc.) there are utilized, besides direct current servomotors and asynchronous, biphase servomotors, controlled by amplifiers or relays, also amplifying servomotors with shaded poles. These can be controlled by substantially reduced direct current power, the rotor's rotational direction depending on the direction of the current flowing through the motor's control turns.

As the shaded poles of these servomotors represent magnetic amplifiers or magnetic relays, the respective poles can be saturated with substantially reduced power, thus avoiding the dephasing due to the shading turns of these poles and causing a rotation of the rotor in the direction of the torque determined by the nonsaturated shaded poles.

By the utilization of such servomotors, having a very high amplifying factor, the need for amplifiers in the automatic system may be avoided and the actuating element may be directly controlled by transducers (photodiodes, thermistors, etc.).

The amplifying servomotors with shaded poles present, however, a complex construction and their active stator materials are insufficiently utilized. Moreover, due to the existence of the shading turns, the efficiency is low.

As actuating elements, there are also known and utilized ferroresonant servomotors. The reversal of the rotation direction of these motors and the regulation of their speed is realized through the saturation, by some control coils provided on the pole columns and through which flows the control current, of the poles supporting the primary stator coils of the machine. The stator poles are provided with two or three columns having windings, the magnetic circuit being closed in such a way that the columns may be saturated by means of the control coils.

The primary stator coils, which embrace all the columns of the poles with control coils, are connected in such a way in two identical ferroresonant circuits, that the saturation of one pair of opposed poles shifts the primary current's phase at the respective poles in comparison with the phase at the other poles, thus causing a starting torque in one direction. For the opposed direction, the other pair of poles has to be saturated, also with a direct control current.

However, as the machine's poles are directly saturated by the control signal, such servomotors need very large amounts of control power in comparison with the power available from transducers with direct current output (photodiodes, thermistors, etc.). Thus the motor cannot be directly controlled from these transducers and the amplifiers existing in the automatic systems cannot be eliminated.

The invention concerns such ferroresonant servomotors, in which control coils applied on the poles (which in the following will be called saturation coils) are connected in series circuits with diodes, while the circuits thus obtained are connected in parallel and are connected with an alternating-current voltage supply.

The ferroresonant servomotor is an element which has several functions in the automatic system. This servomotor is at the same time an actuator, an amplifier and a DC–AC convertor. It can be controlled with very low-power DC signals of 0.05–15 mW., the rotation direction of the rotor depending only on the control-current direction.

The servomotor has the same number of poles and approximately the same structure as a two-phase-induction motor with salient poles designed for the same speed. Each pole has a pole coil and principal and auxiliary control coils. The pole coils of the opposite poles are series connected with two equal capacitances, forming two identical ferroresonant circuits. Suppose that the current in all the main control coils is zero and that the elements of both ferroresonant circuits are so selected that at the nominal voltage the characteristic is capacitive. Then the pole coil currents will be approximately equal and in phase for both pairs of poles. The pole fluxes will also be in phase and the starting torque will be zero. Passing a current through the main control coils of a pair of diametrical poles, saturates the respective pole legs. The result is a phase difference of the pole-coil currents and of the fluxes, as follows:

For a locked rotor, a phase difference is produced because the circuit with saturated poles becomes more capacitive. The increase of phase difference is nearly proportional to the main control current. Increasing the phase difference of the pole fluxes increases the starting torque, also in the corresponding sense, depending on which pair of poles is saturated.

When the rotor is run unloaded, a phase difference, again approximately linear, is produced between the pole currents, up to a critical control current dependent on the speed. Above this value, a sudden jump of the current phase is produced in the unsaturated pole coils, the particular circuit becoming inductive. This takes place simultaneously with the sudden increase of the speed. The saturated pole circuit remains capacitive, the phase angle of its current being reduced.

The main control coils and the auxiliary control coils are connected as magnetic amplifiers which self saturate. In this case, the control of the servomotor is carried out by the auxiliary control coils. At a control signal $I_c$, with arbitrary sense, the current $I_c$ which flows through the main control coils of a pair of poles increases, and the current flowing through the other of pair poles decreases. This determines an average state of saturation of the pole legs. If the rotor is stationary, the starting torque has a sense corresponding to the control signal. On reversing the sense of the auxiliary control current $I_c$, the sense of the starting torque and the running sense are reversed.

The diodes feeding the saturation coils applied on poles of opposite sign, through which flows the flux of the primary coils of the same ferroresonant circuit, are connected in a direction opposed to that of the conduction.

According to the invention, the columns of the stator poles are provided, besides with the saturation coils, also with control coils proper. Through the control coils proper flows the direct control current.

As the connection or winding direction of these control coils is chosen (from the two possible directions) that for which the ampere-turns of the control coils proper and the ampere-turns of the saturation coils are added in the magnetic circuits of the poles at the poles of one of the ferroresonant circuits and are subtracted at the poles of the other ferroresonant circuit, at a control signal of an arbitrarily chosen direction. In this way, the mean value of the saturation coils' current may be controlled by the ampere-turns of the control coils and thus the permeance of the stator poles and implicitly the phase of the currents flowing in the ferroresonant circuits depend on the value and the direction of the control current.

However, differing from the known magnetic self-saturating amplifiers there exists here an interdependence between the mean current in the saturation coils of the ferroresonant servomotors according to the invention and the current of the ferroresonant circuits, this interdependence acting by means of the alternating flux of the primary coils, flux which flows also through the columns of the amplifying poles.

At a control signal of a given direction or polarity, the equilibrium of the saturation currents is disturbed, these saturation currents acquiring greater values in one of the saturation circuits and lesser ones in the other in such a way that a pair of poles will be strongly saturated, while the other one remains nonsaturated and, as a consequence, there will exist a phase shifting between the alternating currents of the two ferroresonant circuits, thus generating a starting torque and a rotating field corresponding to the respective direction.

At a direct current control signal of a reversed direction, the corresponding processes occur in a contrary direction to those mentioned and the starting torque is reversed.

The resistance of the squirrel cage rotor is chosen of a sufficient value such that, when there is no control current, the rotor stops, corresponding to the usual way of utilizing asynchronous servomotors.

In this way the servomotor realizes a power amplification in two steps. In these conditions, the phase shifting of the pole current depends not only on the control signal but also on the speed of the rotor. In this way, if the rotor has a zero speed, the current in the respective ferroresonant circuit acquires by the saturation of one pair of poles a pronounced capacitive character, in comparison with the current of the nonsaturated poles. In this case the accentuation of the phase shifting depends in a nearly linear proportion on the control signal. Thus the respective phase shifting, enables the starting torque be generated.

If the rotor is running idly, there occurs at a given speed and consequently at a given critical control current, a pronounced nonlinear shifting of the phase of the pole current at the nonsaturated poles and the nonsaturated circuit takes on a pronounced inductive character, while the saturated circuit continues to remain capacitive.

This linear behavior of the servomotor, for weak control signals and consequently at corresponding low speeds, and the nonlinear behavior at large control signals is due to the interaction between the currents of the ferroresonant circuits (the polar flows) and the saturation currents.

The saturation coils and the control coils from the columns of each pole are thus connected between them so that their ampere-turns are added along the length of the poles' magnetic circuit.

There exists the possibility that the ferroresonant servomotors according to the invention can be made with more than a pair of poles for each phase, maintaining in this case for the poles of a part of the stator (a half, a quarter, etc.) the conditions above-noted for the whole stator.

For the servomotors according to the invention, the control coils of the poles may be connected in series, in parallel, or in series-parallel connection. For servomotors with a greater number of poles, a part of these may be amplifiers, as shown before, while the others may be provided only with saturation coils connected as a direct or alternating current load of the amplifying poles.

The stator poles may be provided with two, three or several winding supporting columns and may be assembled, as required, from U + I or E + I-sheets and so forth, the I-sheets being disposed in alternate manner or on both sides of the pole (towards the air gap and towards the magnetic yoke) or on only one side.

The ferroresonant circuits may have also a parallel resonance, but, independently of this resonance, the primary coils may be connected in series, parallel or both.

According to the invention, reaction coils may be also mounted on the poles of the servomotor, besides the saturation coils and the control coils, the reaction coils being connected with the control coils in a magnetic relay connection, with self-saturation. Thus for a control current of a certain direction and a certain value, through the effect of the reaction coils, the saturation current increases suddenly at a pair of poles and decreases suddenly at the other pair of poles. Consequently while a pole pair is in a saturated state, the other one remains in a nonsaturated state which causes a phase shifting of the currents passing through the two ferroresonant circuits and provides a starting torque in the direction corresponding to that of the control current.

For a control signal of the opposed direction, also of a corresponding value, the magnetic relays switch suddenly in the reversed direction, the formerly nonsaturated pole pair becoming saturated and the saturated pole pair becoming nonsaturated.

There exists also the possibility of utilizing a polarization coil mounted on the poles besides the saturation, control and reaction coils, for shifting the relay curves and varying their position with regard to the axes or their relative position.

The saturation, control and reaction coils may also be mounted in a magnetic amplifier connection with external reaction or in a magnetic relays connection with external reaction, but these connections are less advantageous than those with self-saturation.

FIGS. 1, 2, 3, 4 and 5 show some examples of the application of the invention.

In FIG. 1 are shown the primary coils 1 through which passes the primary current of the machine, these coils being elements of the two ferroresonant circuits. Also shown are the saturation coils 2 and the control coils 3. These are fixed on the columns 4 of the poles, and these poles are fixed with wedges 5 in the stator yoke. The short circuit rotor is shown at 6.

Figure 2:
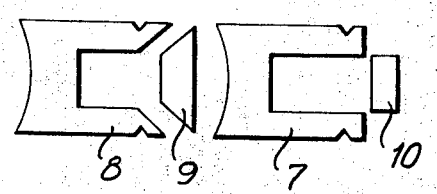
FIG. 2 shows a detail of the construction of stator pole sheets and particularly of I-sheets, on only one side, towards the stator yoke.

The pole sheets 7 and 8 of FIG. 2 are assembled in an alternate manner. A U-shaped core is made up of the alternate sheets 7 and 8, and then the coils are applied and the magnetic circuit is closed with the sheets 9 and 10, which are also assembled in alternate relationship.

There exists also the possibility to fix the poles through expanding wedges at the base of the pole (towards the airgap); the wedges protrude between the poles while these poles, having in the related zone an adequate slope, are pressed by the wedges against the yoke and are thus fixed.

The wedges made of textolite, fiber or other plastic materials are expanded between the poles, after the primary coils have been introduced.

Figure 3:
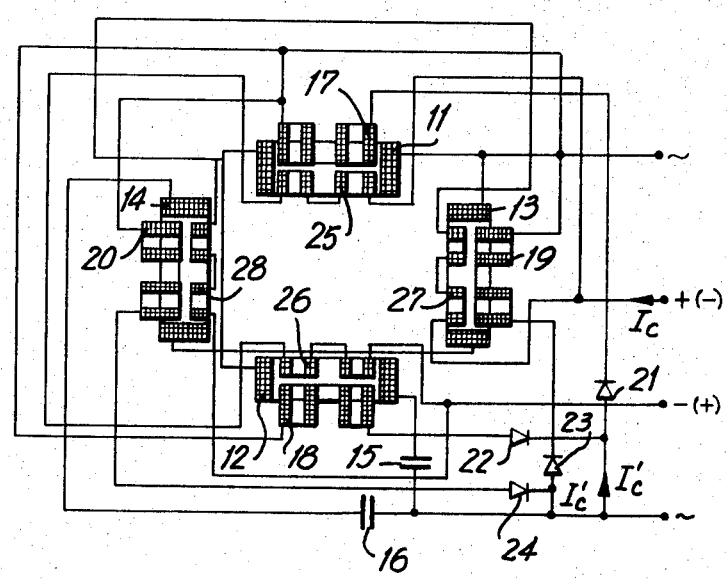
FIG. 3 is a schematic diagram of the motor of FIG. 1.

The diagram of FIG. 3 shows the primary coils 11, 12, 13 and 14 which, together with the capacitors 15 and 16 make up the ferroresonant circuits. There are also shown the saturation coils 17, 18, 19 and 20 connected with the diodes 21, 22, 23 and 24 and the control coils 25, 26, 27 and 28. The latter ones are connected in such a way in the control circuit that, for a control signal $I_{c_1}$ at a pole pair, the saturation current at one pole pair increases (curve 29 FIG. 4) while at the other pair this current decreases (curve 30, FIG. 4). Curves 29 and 30 of FIG. 4 represent the interdependence between the saturation currents $I'_c$ and the control currents $I_c$ for one pair of amplifying poles, corresponding to one ferroresonant circuit (continuous line) and for the other pair of poles corresponding to one ferroresonant circuit (interrupted line).

Figure 5:
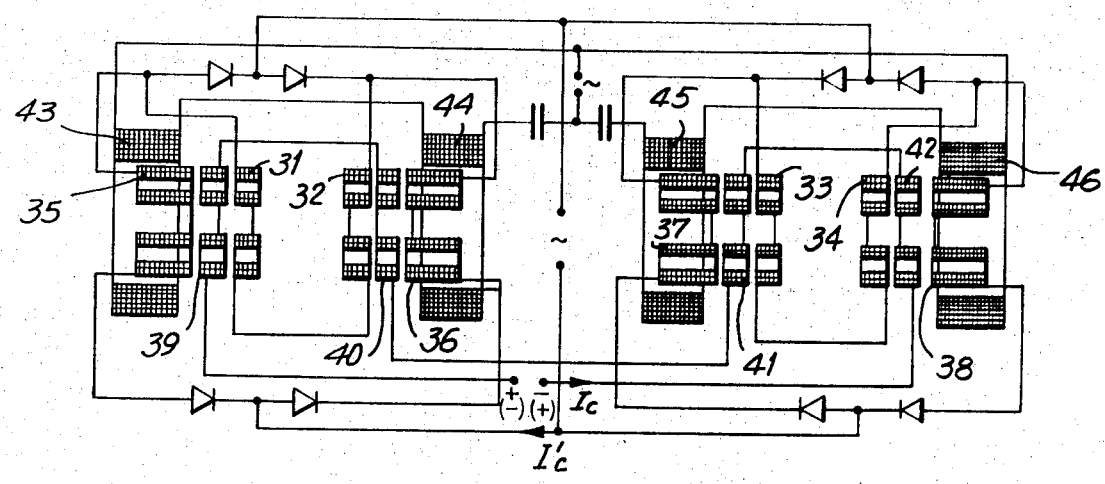
FIG. 5 is a schematic diagram of the servomotor with the poles working as relays with self-saturation.

FIG. 5 shows the reaction coils 31, 32, 33 and 34 connected in a magnetic relay circuit together with the saturation coils 35, 36, 37 and 38 and with the control coils 39, 40, 41 and 42. The primary coils of this ferroresonant circuit are noted at 43, 44, 45 and 46.

Figure 6:
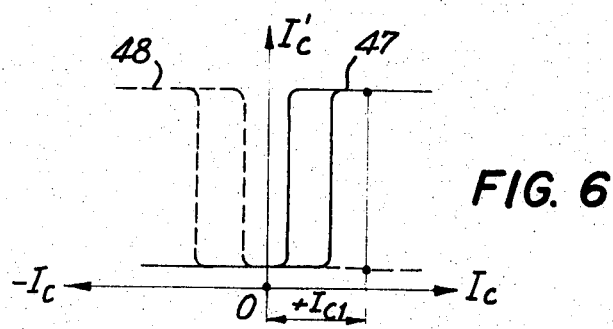
FIG. 6 shows the characteristics of the control currents $I_c$ and the saturation currents $I'_c$ corresponding to the diagram of FIG. 4.

In these conditions, the nonlinear variation of the saturation currents $I_c$, as a function of the control currents $I_c$, is represented in FIG. 6 by the curves 47 (for one pair of poles) and 48 (for the other pair of poles). These characteristics are similar to those of self-saturating magnetic relays, presenting however, due to the reaction coils this pronounced nonlinear form. By a corresponding polarization the relay curves may be shifted—as required—with regard to the axes.

Figure 4:
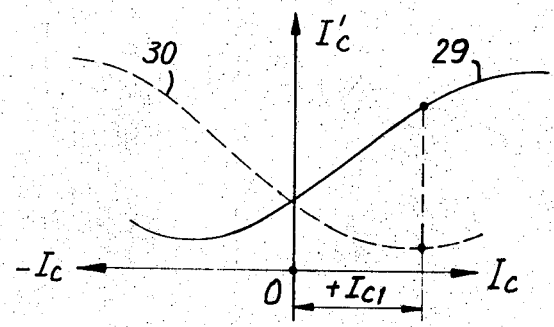
FIG. 4 illustrates the characteristics of the control currents $I_c$ and the saturation currents $I'_c$, corresponding to the diagram of FIG. 3.

All of the characteristics, as well as those of FIG. 4 and those of FIG. 6 are derived for the case of the rotor in rest. For an idle running rotor and for very large (overcritical) control signals, the characteristics are modified due to the nonlinear phenomena of the ferroresonant circuits.

The invention presents the following advantages:

a. the servomotor can respond to a very reduced control power (of the order of tens of microwatts up to milliwatts) and can therefore be directly controlled by transducers with a direct current output (photodiodes, thermistors, etc.), thus avoiding the need for amplifiers, converters and their respective supplies in the automatic system;

b. the servomotor is of a much simpler construction than amplifying servomotors with screened poles, has no short circuit turns and has, for the same power, a better efficiency and lesser overall dimensions;

c. the servomotor has no elements with mobile contacts (collector) and its reliability is correspondingly high;

d. the servomotor has a linear behavior for reduced control signals (i.e., near the stable working conditions) in an automatic system, while for large control signals the behavior is nonlinear, which is very advantageous for numerous automatic systems.

What is claimed is:

1. A ferroresonant servomotor assembly comprising rotor and stator means, one of said rotor and stator means including a plurality of poles, arranged in pairs of poles of opposite polarity, primary coils, saturation and control windings connected at respective poles of said pairs of poles to form at least two ferroresonant circuits which generate flux, each of said two ferroresonant circuits including two of said primary coils from one pair of poles of opposite polarity, rectifier means connected in series with respective saturation windings, each of said rectifier means at one pole of a pair of poles being connected in opposing polarity with respect to the rectifier means connected to the saturation winding connected at the other pole of said pair of poles of opposite polarity means for applying an AC voltage to said ferroresonant circuits and to said primary windings, and means applying a DC control current to said control winding, the control and saturation windings in one of said pair of poles having ampere-turns arranged in additive relation in the closed magnetic circuit of each of said poles situated in the interior of said primary windings, an in an other of said pair of poles in bucking relation, so that at a control current of an arbitrary sense, the current through said saturation windings is increased at the poles of one of said ferroresonant circuits and reduced at the poles of the other ferroresonant circuit.

2. An assembly as claimed in claim 1 including capacitors connected to respective ones of said primary windings.

3. An assembly as claimed in claim 1 wherein the rectifier means are diodes.

4. An assembly as claimed in claim 1, further comprising reaction windings mounted on said poles in the same closed magnetic circuits with the said control and saturation windings, said reaction windings being connected with the saturation and control windings in self-saturating magnetic relay circuits, each relay circuit including two poles with two saturation windings, two control windings, two reaction windings and four diodes, the said saturation windings causing the saturation of the corresponding poles of one of the said ferroresonant circuits, the saturation and control windings being in additive relation at the poles of one of the ferroresonant circuits and in bucking relation at the poles of the other ferroresonant circuits.

5. An assembly as claimed in claim 4 wherein said reaction windings are wound to have ampere-turns in additive relation with the ampere-turns of the saturation windings.

6. An assembly as claimed in claim 4 wherein said reaction windings are wound to have ampere-turns in bucking relation with the ampere-turns of the saturation windings.

* * * * *